United States Patent Office 2,883,321
Patented Apr. 21, 1959

2,883,321
FUNGICIDAL COMPOSITION COMPRISING THE REACTION PRODUCT OF A PHENYLHYDRAZINE WITH CARBON DISULFIDE, AND THE METHOD OF PREPARATION

Van R. Gaertner, Dayton, Ohio, assignor to Monsanto Chemical Company, St. Louis, Mo., a corporation of Delaware No Drawing. Application December 3, 1956
Serial No. 625,582

15 Claims. (Cl. 167—33)

The present invention relates to derivatives of hydrazine compounds and more particularly provides new and valuable derivatives of 1-(2-aminoethyl)-2-phenylhydrazine, the method of preparing the same, and biological toxicants comprising the new products as the effective ingredients.

Preparation of 1-(2-aminoethyl)-2-phenylhydrazine by the addition reaction of one mole of phenylhydrazine with one mole of ethylenimine forms the subject of my copending application Serial No. 625,581, filed of even date. Now I have found that when contacted with carbon disulfide, 1-(2-aminoethyl)-2-phenylhydrazine forms a difficultly crystallizable 1:1 addition product of pronounced biological effect and that when the said addition product is heated at a temperature at which hydrogen sulfide is evolved therefrom, it yields a product from which there is readily isolated a well-characterized, high-melting crystalline solid which analyzes $C_9H_{11}N_3S$ and which probably is 1-anilino-2-imidazolidinethione of the formula

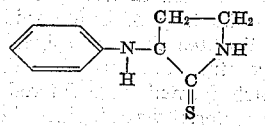

The residue obtained upon separation of said crystalline solid is a red-brown gum which is insoluble in water and soluble in ethanol and ethyl ether. It is believed to be of a polymeric nature. As will be shown hereinafter, both the crystalline solid and the gum possess biological toxicant properties. However, the two are not equally effective against some organisms. Whereas the gum inhibits completely the growth and multiplication of wheat rust fungi at a concentration of as low as 0.25 percent, at this concentration the crystalline solid is entirely ineffective against this pest. On the other hand, said solid surprisingly possesses a systemic effect against tomato wilt and tomato leaf-spot fungi when employed against these organisms at a concentration of as low as 0.01 percent.

Although, as has been pointed out above, the nature of the present reaction products is not at all certain, indications are that their formation from 1-(2-aminoethyl)-2-phenylhydrazine may be set forth schematically as follows:

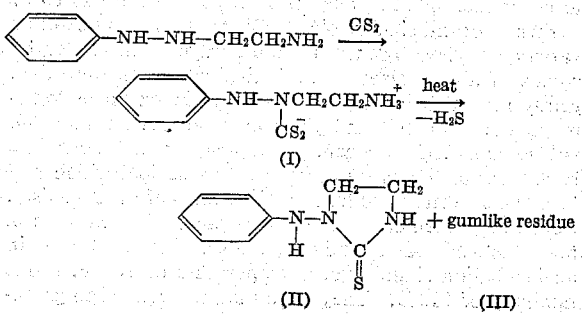

Although (I) above indicates a salt-like structure for the addition product of 1-(2-aminoethyl)-2-phenylhydrazine and carbon disulfide, said addition product may be also regarded as 1-(2-aminoethyl)-2-phenylhydrazinecarbodithioic acid:

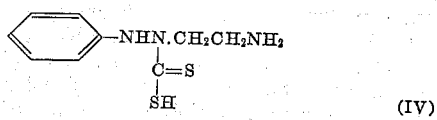

The product obtained from carbon disulfide will be hereinafter referred to simply as the crystalline, 1:1 carbon disulfide-1-(2-aminoethyl) - 2 - phenylhydrazine addition product.

Similarly, while (II) above depicts 1-anilino-2-imidazolidinethione with certainty, here again there is no surety that the compound obtained in this step has the indicated structure. Accordingly, of necessity, the compound indicated by (II) above can be characterized only as the crystalline solid, $C_9H_{11}N_3S$, obtained by heating the 1:1 carbon disulfide-1-(2-aminoethyl)-2-phenylhydrazine addition product at a temperature at which hydrogen sulfide is evolved. Similarly, the residue (III) can be characterized presently only as the gumlike residue remaining after separation of the crystalline solid $C_9H_{11}N_3S$ from the reaction mixture obtained by heating the crystalline 1:1 carbon disulfide-1-(2-aminoethyl)-2-phenylhydrazine addition product at a temperature at which hydrogen sulfide is evolved from said addition product.

The present invention thus covers a 1-(2-aminoethyl)-2-phenylhydrazine derivative selected from the class consisting of the 1:1 addition product of carbon disulfide with 1-(2-aminoethyl)-2-phenylhydrazine, the reaction mixture obtained upon heating said 1:1 addition product at a temperature at which hydrogen sulfide is evolved, the crystalline solid $C_9H_{11}N_3S$ compound isolated from said reaction mixture, and the gum-like residue remaining after isolation of the solid $C_9H_{11}N_3S$ compound from the reaction mixture.

In preparing the 1:1 carbon disulfide 1-(2-aminoethyl)-2-phenylhydrazine I prefer to operate substantially as follows:

The 1-(2-aminoethyl)-2-phenylhydrazine is contacted with carbon disulfide in the presence or absence of an inert diluent at ordinary or moderately increased temperatures. Since instant precipitation occurs upon mixing the carbon disulfide with said hydrogen compound, in order to effect smooth reaction I prefer to introduce the carbon disulfide gradually; also for good control of the reaction I prefer to operate in the presence of an inert solvent or diluent, e.g., ethyl ether, dioxane, benzene, hexane, etc. The resulting reaction mixture comprises a mixture of the 1:1 carbon disulfide-1-(2-aminoethyl)-2-phenylhydrazine addition product and the inert solvent, if one were employed. The solvent may be removed from the reaction mixture by methods known to those skilled in the art, e.g., volatilization, or the crude reaction mixture may be employed directly, e.g., as a biological toxicant or for the preparation of said crystalline solid $C_9H_{11}N_3S$ and the gum-like product obtained from the 1:1 addition product by heating at a temperature at which hydrogen sulfide is evolved. If desired the 1:1 addition product may be crystallized, for example by allowing it to stand for from several hours to several days and/or employing mechanical crystallization aids. The crystalline product thus obtained is quite unstable and therefore difficult to handle. Hence, for practical purposes crystallization of the 1:1 carbon disulfide-1-(2-aminoethyl)-2-phenylhydrazine addition product is not generally feasible.

Conversion of said 1:1 product into the solid $C_9H_{11}N_3S$ and the gum-like, possibly polymeric material, is effected by heating either the crystallized or uncrystallized 1:1 addition product at a temperature at which hydrogen sulfide is evolved. While evolution of hydrogen sulfide is noted at a temperature of about 100° C., in order to accelerate the reaction I prefer to employ a temperature of say from 110° C.–150° C. When evolution of hydrogen sulfide has ceased, heating is discontinued and separation of the solid $C_9H_{11}N_3S$ compound from the reaction mixture may be effected by simply allowing the reaction mixture to stand at ordinary room temperatures or by diluting the reaction mixture with a polar solvent, e.g., ethanol or isopropanol, whereupon the $C_9H_{11}N_3S$ compound crystallizes out. The residual material comprises the gum-like, possibly polymeric product.

The present 1:1 carbon disulfide-1-(2-aminoethyl)-2-phenylhydrazine addition product and the products obtained therefrom by heating it to a temperature at which hydrogen sulfide is evolved may be advantageously employed for a variety of industrial and agricultural purposes, e.g., as lubricant additives, as antistatic agents, and as biological toxicants.

I have discovered that the present products are efficient for preventing and retarding fungus growth on plants, fruits, seeds soils, fur, leather, cotton, wool and organic materials in general. They may be applied directly to the organic material which is to be treated, but because they are effective in extremely dilute concentrations, it is preferred to incorporate them with a carrier or diluent.

Fungicidal dusts may be prepared by mixing the present products with dusting materials such as talc, clay, lime, bentonite, pumice, fuller's earth, etc. The present compounds may be dissolved in organic solvents therefor and the resulting solutions used as fungicidal or fungi-preventing sprays. More expediently, a small quantity of a concentrated solution of the present 1:1 adducts or their heat-decomposition products in an organic solvent, e.g., acetone or cyclohexanone, may be added to water in the presence of an emulsifying agent to form an emulsion and the oil-in-water emulsion thus obtained is employed as a spray. Suspensions or dispersions of the present compounds in water are advantageously employed in the treatment of plant foliage, textiles, leather, or other organic material with which it is not desirable to employ either a solid carrier or an organic solvent.

As stated above, some of the present compounds are particularly valuable in the control of cereal rusts, whereby they function as plant chemotherapeutants against the various leaf and stem rusts of wheat, barley, rye and oats and other small grain crop plants. Such cereal rusts as the stem rust *Puccinia graminis tritici*, or the leaf rust *P. rubigo-vera tritici* or the stripe rust *P. glumarum* of wheat usually cannot be controlled by general purpose fungicides. The stem and crown rusts of oats (*P. graminis avenae* and *P. coronata avenae*), as well as the stem rust of rye (*P. graminis secalis*) or the leaf rust (*P. hordei*) of barley display similar resistance.

In prior art, much effort has been expended in the past in breeding rust-resistant strains of these cereals; but as new strains of e.g., wheat, are developed, new races of the above classes of rusts appear and proceed to attack the new, presumably rust-resistant strains of wheat. The history of breeding for rust resistance thus comprises a recurrent introduction of cereal strains which are resistant to prevailing races of the rusts and subsequent appearance of new races of rusts to which the recently introduced cereal strains are susceptible. Accordingly, the eradication of fungus growth by chemical treatment of cereal plants has become subjected to close scrutiny. Unfortunately most of the known fungicides have been found to be unsuitable either because they do not prevent or destroy growth at non-phytotoxic concentrations or because their physical and chemical nature prevents a commercially expedient means of application.

The invention is further illustrated, but not limited, by the following examples:

Example 1

This example describes the preparation of the 1:1 carbon disulfide-1-(2-aminoethyl)-2-phenylhydrazine addition product. The said hydrazine compound was obtained as described in my copending application Serial No. 625,581, filed of even date, by heating phenylhydrazine with ethylenimine and distilling the resulting reaction product to get the presently used 1-(2-aminoethyl)-2-phenylhydrazine, B.P. 115–116° C./0.3–0.4 mm.

To 200 ml. of ethyl ether there was added 9.6 g. (0.07 mole) of said 1-(2-aminoethyl)-2-phenylhydrazine and to the resulting solution there was slowly introduced with stirring 5.3 g. of carbon disulfide during 90 minutes. There was instant precipitation. Stirring was continued for an additional two hours. A portion of the resulting 1:1 carbon disulfide-1-(2-aminoethyl)-2-phenylhydrazine addition product was crystallized by allowing it to stand overnight protected from moisture and carbon dioxide by an Ascarite-filled drying tube. The yellow, powdery crystals (2.5 g.) thus obtained were filtered off, washed with ether and dried. Analysis of the dried crystals gave 20.23% nitrogen, which value compares well with the calculated value (18.5% nitrogen) of a 1:1 carbon disulfide-1-(2-aminoethyl)-2-phenylhydrazine addition product.

Example 2

The uncrystallized portion of the 1:1 carbon disulfide 1-(2-aminoethyl)-2-phenylhydrazine addition product obtained in Example 1 was heated in an oil-bath for two hours at a temperature of 120–130° C. At the end of this time evolution of hydrogen sulfide, which had been noted at the beginning of the heating period, appeared to have ceased. The thick yellow amber reaction mixture was then diluted in 50 ml. of ethanol and filtered with the help of a filter-aid. The filtrate was cooled in a Dry Ice chest overnight, allowed to attain room temperature and mixed with hot ethanol. The crystals which formed were filtered off and additional crystalline material was obtained from the mother liquors upon cooling. The combined crystalline material thus obtained melted at from 155–160° C., and analyzed 56.23% carbon and 6.25% hydrogen, which values correspond to the calculated values, 56.8% and 5.74%, respectively for $C_9H_{11}N_3S$. As heretofore suggested, this crystalline material is probably 1-anilino-2-imidazolidinethione.

Upon removing the solvent from the mother liquors there was obtained as residue a reddish brown gum-like material which is believed to be a polymeric form of the compound $C_9H_{11}N_3S$.

Example 3

This example describes testing of the wheat rust eradicant properties of the crystallized 1:1 carbon disulfide-1-(2-aminoethyl)-2-phenylhydrazine addition product of Example 1, the crystalline solid compound $C_9H_{11}N_3S$ of Example 2 and the gum-like possibly polymeric material of Example 2. The following procedure was used.

Five uniform, six-day old seedlings of a rust-susceptible variety of wheat (Seneca) were sprayed with water by means of an atomizer. The individual leaves were then gently rubbed between the thumb and index finger to remove the "bloom," and then inoculated with *Puccinia rubigo-vera tritici* by gently scraping, up and down the back sides of the rubbed leaves with a scalpel which had been water-wetted and loaded with spores of the organism. Following inoculation, the plants were sprayed with a fine mist of water and maintained for 48 hours in an incubation chamber at a temperature of 70° F. and a humidity of 100%. They were then transferred to greenhouse benches where they were kept for another 48 hours. At the end of that time they were sprayed.

Said 1:1 addition product, said solid compound $C_9H_{11}N_3S$, and said gum-like product were respectively added to 5 ml. portions of acetone and there was then introduced to the resulting solutions approximately 0.1 ml. of an emulsifying agent known to the trade as "Tween 20" and reputed to be a polyoxyethylene sorbitan monolaurate. The resulting mixtures were then respectively diluted with 5 ml. of water to give emulsions containing 0.5% (5000 p.p.m.) and 0.25% (2500 p.p.m.) by weight of the test materials.

Spraying of the plants with the emulsions was effected by means of an atomizer, 5 ml. of each emulsion being used per pot (five plants/pot) respectively. The sprayed plants were then returned to the greenhouse and held there for a week. Observation of the plants at the end of that time disclosed that the plants which had been sprayed with either the 0.5% or the 0.25% emulsion of the 1:1 carbon disulfide 1-(2-aminoethyl)-2-phenylhydrazine addition product or the gum-like product were entirely free of rust pustules, and no evidence of any phytotoxic effect of the emulsions on the sprayed plants was observed. Similarly inoculated but unsprayed plants which had been maintained in the incubator and greenhouse for the same length of time were found to be badly affected by the rust. Those of the plants which had been sprayed with the 0.25% emulsion of the crystalline solid compound $C_9H_{11}N_3S$ were as badly affected by the rust as the similarly inoculated but unsprayed plants, whereas those which had been sprayed with the 0.5% emulsion of said compound $C_9H_{11}N_3S$ showed only fair control of the rust.

*Example 4*

This example describes evaluation of the crystalline solid compound $C_9H_{11}N_3S$ as a systemic agent in the control of tomato wilt.

Three two-week old Bonny Best tomato seedlings were immersed into water containing 100 parts per million of the test compound. After 48 hours the seedlings were removed and the root systems were rinsed thoroughly in tap water to remove any chemical residue. Approximately ⅓ of each lateral root system of each plant was severed and the wounded roots were dipped for 30 seconds in a bud-cell suspension of *Fusarium oxysporum* f. *lycopersici*. The thus inoculated plants were then potted in 4-inch clay pots of steamed-soil. "Blanks" were prepared by similarly inoculating and potting tomato seedlings which had not been exposed to the solid. The potted plants were then set in the greenhouse for observation.

Marked Fusarium wilt symptons were noted on the "blanks," whereas the plants which had been treated with the test solution appeared to be in excellent condition. At this time disease incidence in the plants which had been immersed in the test compound as shown above was investigated by cross-sectioning the stem of each of the treated and inoculated plants and examining them for vascular browning. No vascular discoloration was noted. Similar examination of the "blanks" showed pronounced browning.

What I claim is:

1. A nitrogenous organic compound selected from the class consisting of the 1:1 carbon disulfide-1-(2-aminoethyl)-2-phenylhydrazine addition product obtained by contacting 1-(2-aminoethyl)-2-phenylhydrazine with carbon disulfide, the dehydrosulfurization product obtained upon heating said 1:1 addition product at a temperature at which hydrogen sulfide is evolved, the crystalline solid $C_9H_{11}N_3S$ compound recovered from said dehydrosulfurization product, and the gum-like residue remaining after recovery of the solid $C_9H_{11}N_3S$ compound from said dehydrosulfurization product.

2. The 1:1 carbon disulfide-1-(2-aminoethyl)-2-phenylhydrazine addition product obtained by contacting 1-(2-aminoethyl)-2phenylhydrazine with carbon disulfide.

3. The dehydrosulfurization product obtained upon heating a 1:1 carbon disulfide-1-(2-aminoethyl)-2-phenylhydrazine addition product at a temperature at which hydrogen sulfide is evolved.

4. The crystalline solid compound $C_9H_{11}N_3S$ prepared by heating a 1:1 carbon disulfide-1-(2-aminoethyl)-2-phenylhydrazine addition product at a temperature at which hydrogen sulfide is evolved and recovering said crystalline solid from the resulting dehydrosulfurization product.

5. The gum-like residue obtained by heating a 1:1 carbon disulfide-1-(2-aminoethyl)-2-phenylhydrazine addition product at a temperature at which hydrogen sulfide is evolved and removing from the resulting dehydrosulfurization product a crystalline solid compound $C_9H_{11}N_3S$.

6. The method which comprises contacting 1-(2-aminoethyl)-2-phenylhydrazine with carbon disulfide to obtain a 1:1 carbon disulfide-1-(2-aminoethyl)-2-phenylhydrazine addition product, heating said addition product at a temperature at which hydrogen sulfide is evolved, removing from the resulting dehydrosulfurization product a crystalline solid $C_9H_{11}N_3S$ and obtaining a gum-like material as residue.

7. The method of preparing a 1:1 carbon disulfide-1-(2-aminoethyl)-2-phenylhydrazine addition product which comprises contacting 1-(2-aminoethyl)-2-phenylhydrazine with carbon disulfide.

8. The method which comprises contacting 1-(2-aminoethyl)-2-phenylhydrazine with carbon disulfide to obtain a 1:1 carbon disulfide-1-(2-aminoethyl)-2-phenylhydrazine addition product, and heating said 1:1 addition product at a temperature at which hydrogen sulfide is evolved to obtain a dehydrosulfurization product.

9. The method which comprises contacting 1-(2-aminoethyl)-2-phenylhydrazine with carbon disulfide to obtain a 1:1 carbon disulfide-1-(2-aminoethyl)-2-phenylhydrazine addition product, heating said addition product at a temperature at which hydrogen sulfide is evolved and isolating from the resulting dehydrosulfurization product a crystalline solid $C_9H_{11}N_3S$ compound.

10. A fungicidal composition comprising an inert carrier and as the essential effective ingredient a nitrogenous organic compound selected from the class consisting of the 1:1 carbon disulfide-1-(2-aminoethyl)-2-phenylhydrazine addition product obtained by contacting 1-(2-aminoethyl)-2-phenylhydrazine with carbon disulfide, the dehydrosulfurization product obtained upon heating said 1:1 addition product at a temperature at which hydrogen sulfide is evolved, the crystalline solid $C_9H_{11}N_3S$ compound recovered from said dehydrosulfurization product, and the gum-like residue remaining after recovery of the solid $C_9H_{11}N_3S$ compound from said dehydrosulfurization product.

11. A wheat rust eradicant comprising an inert carrier and as the essential effective ingredient the 1:1 carbon disulfide-1-(2 - aminoethyl) - 2 - phenylhydrazine addition product obtained by contacting 1 - (2 - aminoethyl) - 2 - phenylhydrazine with carbon disulfide.

12. A wheat rust eradicant comprising an inert carrier and as the essential effective ingredient the gum-like residue obtained by contacting 1-(2-aminoethyl)-2-phenylhydrazine with carbon disulfide to get a 1:1 carbon disulfide-1-(2 - aminoethyl) - 2 - phenylhydrazine addition product, heating said addition product at a temperature at which hydrogen sulfide is evolved and removing from the resulting dehydrosulfurization product a crystalline solid $C_9H_{11}N_3S$ compound.

13. A composition effective against tomato wilt fungi which comprises an inert carrier and as the essential effective ingredient the crystalline solid $C_9H_{11}N_3S$ compound obtained by contacting 1-(2-aminoethyl)-2-phenylhydrazine with carbon disulfide to get a 1:1 carbon disulfide-1-(2-aminoethyl) - 2 - phenylhydrazine addition product, heating said addition product at a temperature at which hydrogen sulfide is evolved and recovering said $C_9H_{11}N_3S$ compound from the resulting dehydrosulfurization product.

14. The method of inhibiting fungus growth which comprises exposing said fungi to a fungicidal composition comprising a fungitoxic quantity of a nitrogenous organic compound selected from the class consisting of the 1:1 carbon disulfide-1-(2-aminoethyl)-2-phenylhydrazine addition product obtained by contacting 1-(2-aminoethyl)-2-phenylhydrazine with carbon disulfide, the dehydrosulfurization product obtained upon heating said 1:1 addition product at a temperature at which hydrogen sulfide is evolved, the crystalline solid $C_9H_{11}N_3S$ compound recovered from said dehydrosulfurization product, and the gum-like residue remaining after recovery of the solid $C_9H_{11}N_3S$ compound from said dehydrosulfurization product.

15. The method of inhibiting wheat rust on wheat plants which comprises applying to said wheat plants a rust inhibiting quantity of a composition comprising as the essential effective ingredient a nitrogenous organic compound selected from the class consisting of the 1:1 carbon disulfide-1-(2-aminoethyl)-2-phenylhydrazine addition product obtained by contacting 1-(2-aminoethyl)-2-phenylhydrazine with carbon disulfide, the dehydrosulfurization product obtained upon heating said 1:1 addition product at a temperature at which hydrogen sulfide is evolved, the crystalline solid $C_9H_{11}N_3S$ compound recovered from said dehydrosulfurization product, and the gum-like residue remaining after recovery of the solid $C_9H_{11}N_3S$ compound from said dehydrosulfurization product.

No references cited.

UNITED STATES PATENT OFFICE
CERTIFICATION OF CORRECTION

Patent No. 2,883,321                                April 21, 1959

Van R. Gaertner

It is hereby certified that error appears in the above numbered patent requiring correction and that the said Letters Patent should read as corrected below.

Column 1, lines 35 to 40, the formula should appear as shown below instead of as in the patent:

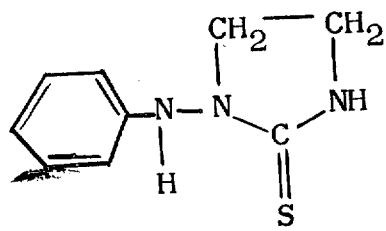

Signed and sealed this 13th day of June 1961.

(SEAL)
Attest:

ERNEST W. SWIDER
Attesting Officer

DAVID L. LADD
Commissioner of Patents